United States Patent
Solfrank

(10) Patent No.: US 8,695,555 B2
(45) Date of Patent: Apr. 15, 2014

(54) MASS BALANCING MECHANISM OF AN INTERNAL COMBUSTION ENGINE

(75) Inventor: Peter Solfrank, Frensdorf (DE)

(73) Assignee: Schaeffler Technologies GmbH & Co. KG, Herzogenauarch (DE)

( * ) Notice: Subject to any disclaimer, the term of this patent is extended or adjusted under 35 U.S.C. 154(b) by 348 days.

(21) Appl. No.: 13/265,644

(22) PCT Filed: Apr. 27, 2010

(86) PCT No.: PCT/EP2010/055580
§ 371 (c)(1),
(2), (4) Date: Oct. 21, 2011

(87) PCT Pub. No.: WO2010/127959
PCT Pub. Date: Nov. 11, 2010

(65) Prior Publication Data
US 2012/0037109 A1   Feb. 16, 2012

(30) Foreign Application Priority Data
May 6, 2009  (DE) .......................... 10 2009 020 134

(51) Int. Cl.
*F02B 75/06*  (2006.01)
(52) U.S. Cl.
USPC ........................................ 123/192.2; 74/603

(58) Field of Classification Search
USPC ......................................... 123/192.2; 74/603
See application file for complete search history.

(56) References Cited

U.S. PATENT DOCUMENTS

| | | | |
|---|---|---|---|
| 2,914,963 | A | 2/1955 | Scherenberg |
| 2004/0101225 | A1 | 5/2004 | Del Rio et al. |

FOREIGN PATENT DOCUMENTS

| | | |
|---|---|---|
| DE | 20 2007 011678 | 10/2007 |
| EP | 1304450 A2 | 4/2003 |
| EP | 0243683 | 5/2004 |
| FR | 2619881 | 3/1989 |

*Primary Examiner* — Noah Kamen
(74) *Attorney, Agent, or Firm* — Volpe and Koenig, P.C.

(57) ABSTRACT

A mass balancing mechanism is provided for balancing mass forces and/or mass torques of an internal combustion engine. The mass balancing mechanism includes an unbalanced shaft (4) having shaft sections (6, 7) for generating the imbalance, two outer bearing journals (9, 10), and at least one inner bearing journal (5) that connects two of the shaft sections, at which bearing journals the unbalanced shaft is rotatably supported at associated bearing points (2, 1, 3) of the internal combustion engine. The inner bearing journal deflects radially relative to the two shaft sections adjacent thereto and forms a radial plain bearing with the inner bearing point (2). According to the invention, the outer bearing journals should each form a radial roller bearing with the outer bearing points (1, 3).

8 Claims, 1 Drawing Sheet

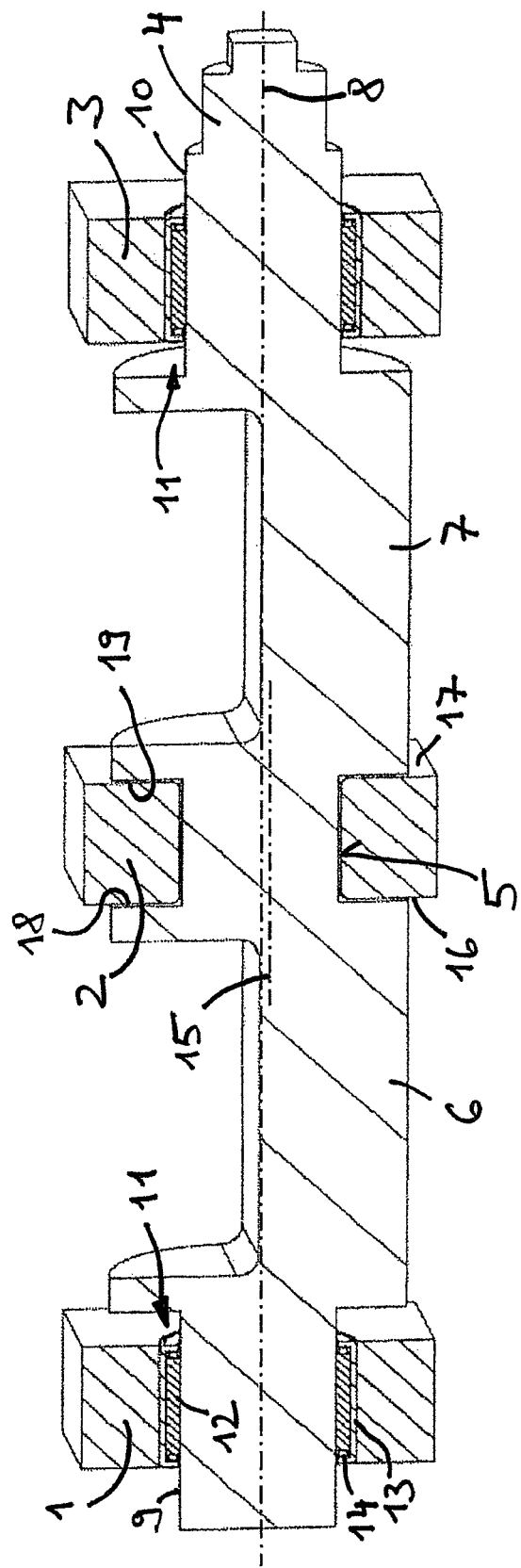

MASS BALANCING MECHANISM OF AN INTERNAL COMBUSTION ENGINE

FIELD OF THE INVENTION

The invention relates to a mass balancing mechanism for balancing mass forces and/or mass torques of an internal combustion engine. The mass balancing mechanism comprises an unbalanced shaft with shaft sections for generating the imbalance, two outer bearing journals, and at least one inner bearing journal connecting two of the shaft sections, wherein, on these bearing journals, the unbalanced shaft is supported so that it can rotate at associated bearing points of the internal combustion engine. Here, the inner bearing journal deflects in the radial direction relative to the two shaft sections adjacent to this journal and forms, with the inner bearing point, a radial plain bearing.

BACKGROUND OF THE INVENTION

Such a mass balancing mechanism follows from EP 1 304 450 A2, which is considered a class-forming patent. The mass balancing mechanism proposed in that publication is used for balancing the free second-order mass forces of a four-cylinder in-line engine and comprises two unbalanced shafts rotating in the opposite direction at twice the crankshaft rotational speed. These are supported in four places and each of these has two successive shaft sections with eccentric centers of mass for generating the imbalance. The diameter of the inner bearing journal connecting the shaft sections is significantly smaller than the surrounding diameter of the shaft sections, so that the substitution of the radial plain bearing provided at this bearing point by a radial roller bearing that is more favorable with respect to friction losses is not possible with a non-divided bearing ring for reasons of assembly—however, a roller bearing with a divided outer ring could be used here, in which, however, due to the then unavoidable step formation on the outer raceway, functional and service life limitations are to be expected. Also, the other three bearing journals of each unbalanced shaft have a plain radial support at the associated bearing points.

From EP 0 243 683 A1, a mass balancing mechanism follows with unbalanced shafts supported in three places and, in this case, completely by rollers. Their geometry with only one shaft section generating the imbalance, however, allows the assembly of non-divided roller bearings without a problem. This applies in the same way for the unbalanced shaft that is disclosed in FR 2 619 881 A1 and is supported, in contrast, by plain bearings instead of roller bearings on the drive-side end section.

SUMMARY

The invention is based on the objective of refining a mass balancing mechanism of the type noted above so that, for an unchanged, problem-free assembly capability of the unbalanced shaft, the operating friction losses of the mass balancing mechanism are reduced as much as possible.

According to the invention, this objective is met in that each of the outer bearing journals forms, with the outer bearing points, a radial roller bearing. In other words, this involves a mass balancing mechanism with a hybrid bearing of the unbalanced shaft, wherein the deflecting inner bearing journal is still supported by a plain radial bearing, while roller bearings that are more favorable in terms of friction are provided between the outer bearing journals and the associated bearing points.

In one refinement of the invention, the radial plain bearing shall be combined with an axial plain bearing of the unbalanced shaft, wherein the two shaft sections are provided with axial thrust surfaces for axial thrust surfaces of axial end faces of the inner bearing point. While this construction, which is simple in terms of production, makes an axial bearing of the unbalanced shaft at another position unnecessary, the axial clearance of the axial plain bearing can also be dimensioned so small that the axial thrust surfaces and the associated axial end faces act as throttles for hydraulic medium emerging from the radial plain bearing. In other words, the axial surfaces of the bearing point and shaft sections sliding one on the other or spaced narrowly from each other generate a flow resistance that accompanies a correspondingly limited hydraulic medium outflow from the radial plain bearing.

The increased sealing effect of the axial plain bearing shaped in this way opens up, in particular, the possibility of dimensioning the radial bearing clearance of the radial plain bearing so large that the inner bearing journal participates in the radial support only above a predetermined bending of the unbalanced shaft. In the low rotational-speed range of the unbalanced shaft, the bearing load turns out to be low, so that the inner bearing journal is unnecessary for a stable bearing of the unbalanced shaft. Due to the eccentric mass distribution, the bending of the unbalanced shaft pointing in the imbalance direction increases with its rotational speed, so that then the inner bearing journal is also significantly responsible for the stable bearing of the unbalanced shaft. This construction taking into account the rotational speed of the unbalanced shaft has the effect primarily that the comparatively high friction losses of the radial plain bearing can be kept negligibly small for low rotational speeds of the unbalanced shaft.

In terms of a continuous contact force buildup adapted to the bending of the unbalanced shaft dependent on the rotational speed in such a radial plain bearing, the inner bearing journal should have a center axis running parallel to the axis of rotation of the unbalanced shaft and offset in the direction of the imbalance.

In a structurally preferred construction, the unbalanced shaft should be produced as a foundry part and each of the radial roller bearings should comprise an inner-ring-free needle bearing, wherein each of the outer bearing journals of the unbalanced shaft is used as an inner raceway for the needles. The extra radial installation-room requirements of a roller bearing in comparison to a plain bearing can be reduced to a minimum, on one hand, by the elimination of an inner ring and, on the other hand, by the use of needles with a small diameter. This applies especially if the needle bearing is also constructed economically as a needle sleeve with a thin-walled outer ring produced without cutting, a cage, and the needles guided therein.

Nevertheless, as an alternative to the inner-ring-free needle bearings, each of the radial roller bearings could be constructed as a needle bearing with an inner ring. This structural construction could be required if the unbalanced shaft is produced not as a foundry part, but instead as an economical cast part that is easier to process and the bearing journals do not have the material properties that are required for a roller-bearing raceway.

BRIEF DESCRIPTION OF THE DRAWINGS

Additional features and constructions of the invention are given from the following description and from the drawing in which an embodiment of the invention is illustrated in a simplified manner. The single FIGURE shows the bearing arrangement of an unbalanced shaft in a perspective longitudinal section.

DETAILED DESCRIPTION OF THE PREFERRED EMBODIMENTS

The FIGURE shows a cross-section of a mass balancing mechanism that is essential for the understanding of the invention and is used for balancing the free second-order mass forces of a four-cylinder in-line engine. One of the two unbalanced shafts rotating in the opposite direction at twice the crankshaft rotational speed is shown and its support in the internal combustion engine, wherein the mounted parts necessary for driving the unbalanced shafts, such as, for example, chain and gearwheels, are left off for the purpose of simplified illustration.

The unbalanced shaft 4 is supported at three locations at bearing points 1, 2, and 3 of the internal combustion engine, and has two shaft sections 6 and 7 connected by an inner bearing journal 5, wherein these shaft sections generate the imbalance each with a center of mass running eccentric to the axis of rotation 8 of the unbalanced shaft 4 and oriented identically in the radial direction. The diameter of the inner bearing journal 5 is significantly smaller than the surrounding diameter of the two adjacent shaft sections 6, 7 and consequently deflects significantly compared to these. An assembly of a roller bearing with a non-divided bearing ring is obviously not possible at this point, so that the inner bearing journal 5 forms, with the inner bearing point 2, a hydrodynamic radial plain bearing.

In contrast, the two outer bearing points 1, 3 form, with the associated outer bearing journals 9, 10 of the foundry unbalanced shaft 4, friction-favorable radial roller bearings. These comprise inner-ring-free needle bearings 11 that can be mounted without a problem on the unbalanced shaft 4, and their needles 12 roll directly on the outer bearing journals 9, 10 constructed as inner raceways. Each of the needle bearings 11 is constructed as a so-called needle sleeve with a thin-walled outer ring 13 produced without cutting, a cage 14, and the needles 12 guided therein.

The radial plain bearing on the inner bearing journal 5 has a significantly larger radial bearing clearance compared to typical constructions. This is dimensioned so large that the inner bearing journal 5 participates in its radial support only above a predetermined bending of the unbalanced shaft 4. As explained above, the bending of the unbalanced shaft 4 increases depending on the imbalance with its rotational speed, so that, below a predetermined limit rotational speed, only the two radial roller bearings at the outer bearing journals 9, 10 contribute decisively to the radial support of the unbalanced shaft 4. As is shown very exaggerated, the center axis 15 of the inner bearing journal 5 runs parallel to the axis of rotation 8 and offset in the direction of the imbalance, in order to generate a continuous contact force buildup in the radial plain bearing.

For limiting the hydraulic medium volume flow emerging from the radial plain bearing affected largely by clearance, an axial plain bearing is used that is adapted in terms of the axial clearance dimensioning and is combined with the radial plain bearing. The axial plain bearing is formed by the axial end faces 16, 17 of the inner bearing point 2 and axial thrust surfaces 18, 19 on the two shaft sections 6, 7, wherein the axial thrust surfaces 18, 19 surround the axial end faces 16, 17 with a significantly smaller axial clearance compared to typical constructions. According to the axial relative position of the unbalanced shaft 4 that the shaft assumes during operation of the mass balancing mechanism compared to the inner bearing point 2, the narrow axial gap or gaps have the effect that the axial plain bearing represents a throttling resistance for hydraulic medium emerging from the radial plain bearing.

LIST OF REFERENCE SYMBOLS

1 Outer bearing point
2 Inner bearing point
3 Outer bearing point
4 Unbalanced shaft
5 Inner bearing journal
6 Shaft section
7 Shaft section
8 Rotational axis of the unbalanced shaft
9 Outer bearing journal
10 Outer bearing journal
11 Needle bearing
12 Needle
13 Outer ring
14 Cage
15 Center axis of the inner bearing journal
16 Axial end face of the inner bearing point
17 Axial end face of the inner bearing point
18 Axial thrust surface
19 Axial thrust surface

The invention claimed is:

1. Mass balancing mechanism for balancing mass forces and/or mass torques of an internal combustion engine, comprising an unbalanced shaft with shaft sections for generating an imbalance, two outer bearing journals and at least one inner bearing journal connecting two of the shaft sections, wherein, at the bearing journals, the unbalanced shaft is supported so that it can rotate at associated inner and outer bearing points of the internal combustion engine, wherein the inner bearing journal deflects in a radial direction relative to the two shaft sections adjacent to the inner bearing journal and forms, with the inner bearing point, a radial plain bearing, and each of the outer bearing journals forms, with the outer bearing points, a radial roller bearing.

2. Mass balancing mechanism according to claim 1, wherein the radial plain bearing is combined with an axial plain bearing of the unbalanced shaft, in that the two shaft sections are provided with axial thrust surfaces for axial end faces of the inner bearing point.

3. Mass balancing mechanism according to claim 2, wherein an axial clearance of the axial plain bearing is dimensioned so small that the axial thrust surfaces and each of the associated axial end faces act as throttles for a hydraulic medium emerging from the radial plain bearing.

4. Mass balancing mechanism according to claim 1, wherein a radial bearing clearance of the radial plain bearing is dimensioned so large that the inner bearing journal participates in the radial support only above a predetermined bending of the unbalanced shaft.

5. Mass balancing mechanism according to claim 4, wherein the inner bearing journal has a center axis running parallel to a rotational axis of the unbalanced shaft and offset in a direction of the imbalance.

6. Mass balancing mechanism according to claim 1, wherein each of the radial roller bearings comprises an inner-ring-free needle bearing, wherein each of the outer bearing journals of the unbalanced shaft produced as a foundry part act as an inner raceway for the needles.

7. Mass balancing mechanism according to claim 6, wherein the needle bearings are constructed as a needle sleeve with a thin-walled outer ring produced without cutting, a cage, and the needles guided in the cage.

8. Mass balancing mechanism according to claim 1, wherein each of the radial roller bearings comprises a needle bearing, wherein each of the outer bearing journals of the unbalanced shaft produced as a cast part is provided with an inner ring used as an inner raceway for the needles.

* * * * *